United States Patent
Imanishi

(10) Patent No.: US 9,902,286 B2
(45) Date of Patent: Feb. 27, 2018

(54) FUEL CELL SYSTEM TO CONTROL THE FREQUENCY OF A FUEL CELL CONVERTER AND A BATTERY CONVERTER

(75) Inventor: Hiroyuki Imanishi, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 620 days.

(21) Appl. No.: 14/342,621

(22) PCT Filed: Sep. 5, 2011

(86) PCT No.: PCT/JP2011/070161
§ 371 (c)(1),
(2), (4) Date: Mar. 4, 2014

(87) PCT Pub. No.: WO2013/035147
PCT Pub. Date: Mar. 14, 2013

(65) Prior Publication Data
US 2014/0225435 A1    Aug. 14, 2014

(51) Int. Cl.
| | |
|---|---|
| H02J 1/00 | (2006.01) |
| B60L 11/18 | (2006.01) |
| H02J 1/10 | (2006.01) |
| H02M 1/44 | (2007.01) |
| H02M 1/10 | (2006.01) |
| H02M 1/00 | (2006.01) |

(52) U.S. Cl.
CPC ......... *B60L 11/1887* (2013.01); *H02J 1/102* (2013.01); *H02M 1/44* (2013.01); *H02M 1/10* (2013.01); *H02M 2001/0067* (2013.01)

(58) Field of Classification Search
CPC ........................................................ H02J 1/102
USPC .................................................. 307/10.1, 151
See application file for complete search history.

(56) References Cited

U.S. PATENT DOCUMENTS

| | | | | |
|---|---|---|---|---|
| 7,816,812 | B2* | 10/2010 | Nakashima ......... | B60L 11/1881 307/44 |
| 2005/0235865 | A1* | 10/2005 | Kumar ...................... | B60L 9/16 105/61 |
| 2006/0172164 | A1* | 8/2006 | Kudo ................ | H01M 8/04029 429/414 |
| 2008/0238383 | A1* | 10/2008 | Watanabe ............... | H02M 1/32 323/271 |

(Continued)

FOREIGN PATENT DOCUMENTS

| | | |
|---|---|---|
| JP | 2005-312279 A | 11/2005 |
| JP | 2005-341752 A | 12/2005 |

(Continued)

*Primary Examiner* — Adi Amrany
(74) *Attorney, Agent, or Firm* — Andrews Kurth Kenyon LLP

(57) ABSTRACT

In a fuel cell system which includes a fuel cell converter and a battery converter, noise generated in a high load region in particular is effectively inhibited, and silence is improved. A fuel cell system includes a fuel cell converter provided between a fuel cell and a load device, and a battery converter provided between a battery and the load device. The fuel cell system includes frequency setting means for setting a driving frequency band of the fuel cell converter and a driving frequency band of the battery converter so that these driving frequency bands do not overlap when a load of the load device is more than a predetermined threshold.

15 Claims, 5 Drawing Sheets

(56) References Cited

U.S. PATENT DOCUMENTS

| | | | |
|---|---|---|---|
| 2009/0166114 A1* | 7/2009 | Taguchi | H02M 3/156 180/65.265 |
| 2010/0013317 A1* | 1/2010 | Ballantine | H02J 1/102 307/82 |
| 2010/0332060 A1* | 12/2010 | Bae | B60L 11/1887 701/22 |
| 2011/0190959 A1* | 8/2011 | Manabe | H01M 8/0488 700/298 |
| 2012/0019068 A1* | 1/2012 | Hasegawa | B60L 3/003 307/43 |
| 2014/0011108 A1* | 1/2014 | O'Neill | G05F 1/575 429/431 |
| 2014/0152089 A1* | 6/2014 | Manabe | H02M 3/1584 307/9.1 |
| 2015/0217660 A1* | 8/2015 | Manabe | H02M 7/44 307/23 |

FOREIGN PATENT DOCUMENTS

| | | |
|---|---|---|
| JP | 2006-333615 A | 12/2006 |
| JP | 2006-340442 A | 12/2006 |
| JP | 2007-049832 A | 2/2007 |
| JP | 2007-120903 A | 5/2007 |
| JP | 2009163948 A * | 7/2009 |
| JP | 2010-163053 A | 7/2010 |
| JP | 2011-019338 A | 1/2011 |

* cited by examiner

FUEL CELL SYSTEM TO CONTROL THE FREQUENCY OF A FUEL CELL CONVERTER AND A BATTERY CONVERTER

CROSS REFERENCE TO RELATED APPLICATION

This is a national phase application based on the PCT International Patent Application No. PCT/JP2011/070161 filed on Sep. 5, 2011, the entire contents of which are incorporated herein by reference.

TECHNICAL FIELD

The present invention relates to a fuel cell system.

BACKGROUND ART

There has heretofore been suggested a fuel cell vehicle installed with: a fuel cell which is supplied with reactant gases (a fuel gas and an oxidation gas) and thereby generates electricity; together with a secondary cell such as a storage cell. In this fuel cell vehicle, an inverter provided between the fuel cell and an electric motor; a controller which controls the inverter by pulse width modulation (PWM); and a converter which converts direct-current voltages supplied from the fuel cell and the secondary cell to higher direct-current voltages, are generally installed.

Meanwhile, a power converter including an inverter and a converter has a problem of resonance caused by the flow of a current corresponding to, for example, a frequency of a carrier signal to a reactor. Accordingly, a technique is suggested at present to double the switching frequency of the converter to double the frequency of a three-phase alternating current flowing through the reactor and thereby reducing magnetic noise (e.g. see Patent Document 1).

Patent Document 1: Japanese Patent Application publication No. 2006-333615

SUMMARY OF THE INVENTION

Problem to be Solved by the Invention

However, if the switching frequency of the converter is set to a higher frequency (higher than an audible range) as in the technique described in Patent Document 1, another problem of an increased temperature of a switching element occurs.

In recent years in particular, a high-electricity multiple-phase converter has been developed. This multiple-phase converter, when used, needs to be controlled so that the temperature of a switching element may not be high. However, there has not yet been any specific consideration of what kind of control to be used. The fuel cell vehicle is provided with a converter for the fuel cell, and a converter for a battery. It is necessary to set driving frequencies of these converters so as not to resonate with a driving frequency of the inverter.

The present invention has been made in view of the circumstances. An object of the invention is to effectively inhibit noise generated in a high load region in particular and to improve silence in a fuel cell system which includes a fuel cell converter and a battery converter.

Means for Solving the Problem

To achieve the above-mentioned object, there is provided a fuel cell system according to the present invention including a fuel cell, a fuel cell converter provided between the fuel cell and a load device, a battery, and a battery converter provided between the battery and the load device. The fuel cell system includes frequency setting means for setting a driving frequency band of the fuel cell converter and a driving frequency band of the battery converter so that these driving frequency bands do not overlap when a load of the load device is more than a predetermined threshold.

If this configuration is used, it is possible to prevent the driving frequency band of the fuel cell converter and the driving frequency band of the battery converter from overlapping in a high load region (a load region in which the load of the load device is more than the predetermined threshold). Therefore, it is possible to effectively inhibit noise generated by the overlapping of the driving frequency bands of the fuel cell converter and the battery converter in the high load region.

In the fuel cell system according to the present invention, it is possible to use the frequency setting means for setting a median of the driving frequency of the fuel cell converter and a median of the driving frequency of the battery converter so that these medians differ from each other by a predetermined frequency (e.g. about 0.2 kHz) when the load of the load device is more than the predetermined threshold.

If this configuration is used, the median of the driving frequency of the fuel cell converter and the median of the driving frequency of the battery converter differ from each other by the predetermined frequency (e.g. about 0.2 kHz), so that it is possible to inhibit the occurrence of a "beat" resulting from the nearness of both the driving frequencies. Therefore, noise can be more effectively inhibited.

In the fuel cell system according to the present invention, it is possible to use the frequency setting means for setting driving frequency bands of the fuel cell converter and the battery converter and a driving frequency band of an inverter which controls various devices so that these driving frequency bands do not overlap when the load of the load device is more than the predetermined threshold.

If this configuration is used, it is possible to prevent the driving frequency bands of the fuel cell converter and the battery converter and the driving frequency band of the inverter which controls various devices (e.g. a traction motor, a hydrogen pump, a cooling water circulating pump, and an air compressor) from overlapping in the high load region. Therefore, it is possible to effectively inhibit noise generated by the overlapping of the driving frequency bands of the fuel cell converter and the battery converter and the driving frequency band of the inverter in the high load region.

In the fuel cell system according to the present invention, it is possible to use the frequency setting means for not changing the driving frequency band of the fuel cell converter when the temperature of a condenser or a switching element included in the fuel cell converter is more than a predetermined threshold.

If this configuration is used, it is possible to prevent the driving frequency band of the fuel cell converter from being changed when the temperature of the condenser or the switching element included in the fuel cell converter is more than the predetermined threshold. Therefore, it is possible to avoid a further increase in the temperature of the condenser or the switching element caused by the change of the driving frequency band of the fuel cell converter, so that the condenser or the switching element can be protected.

In the fuel cell system according to the present invention, it is possible to use a multiple-phase fuel cell converter having a plurality of driving phases as the fuel cell converter.

In this case, it is possible to use the frequency setting means for setting driving frequency bands of the driving phases of the multiple-phase fuel cell converter so that the driving frequency bands of the driving phases do not overlap when the load of the load device is more than the predetermined threshold.

If this configuration is used, it is possible to prevent the driving frequency bands of the driving phases of the fuel cell converter (multiple-phase fuel cell converter) having a plurality of driving phases from overlapping in the high load region. Therefore, it is possible to effectively inhibit noise generated by the overlapping of the driving frequency bands of the driving phases of the multiple-phase fuel cell converter in the high load region.

In the fuel cell system according to the present invention, it is possible to use the frequency setting means for setting medians of the driving frequencies of the driving phases of the multiple-phase fuel cell converter so that these medians differ from each other by a predetermined frequency (e.g. about 0.2 kHz) when the load of the load device is more than the predetermined threshold.

If this configuration is used, the medians of the driving frequencies of the driving phases of the multiple-phase fuel cell converter differ from each other by the predetermined frequency (e.g. about 0.2 kHz) in the high load region, so that it is possible to inhibit the occurrence of a "beat" resulting from the nearness of the driving frequencies of the driving phases. Therefore, noise can be more effectively inhibited.

In the fuel cell system according to the present invention, it is possible to provide driving phase control means for constantly driving all driving phases of the multiple-phase fuel cell converter to reduce a current flowing in each driving phase when the load of the load device is equal to or less than the predetermined threshold.

If this configuration is used, all the driving phases of the multiple-phase fuel cell converter are constantly driven so that the current flowing in each driving phase can be reduced in a low load region (a load region in which the load of the load device is equal to or less than the predetermined threshold). Therefore, reactor noise in each driving phase of the multiple-phase fuel cell converter can be reduced.

In the fuel cell system according to the present invention, it is possible to use a multiple-phase battery converter having a plurality of driving phases as the battery converter. In this case, it is possible to use the frequency setting means for setting driving frequency bands of the driving phases of the multiple-phase battery converter so that the driving frequency bands of the driving phases do not overlap when the load of the load device is more than the predetermined threshold.

If this configuration is used, it is possible to prevent the driving frequency bands of the driving phases of the battery converter (multiple-phase battery converter) having a plurality of driving phases from overlapping in the high load region. Therefore, it is possible to effectively inhibit noise generated by the overlapping of the driving frequency bands of the driving phases of the multiple-phase battery converter in the high load region.

In the fuel cell system according to the present invention, it is possible to use the frequency setting means for setting medians of the driving frequencies of the driving phases of the multiple-phase battery converter so that these medians differ from each other by a predetermined frequency (e.g. about 0.2 kHz) when the load of the load device is more than the predetermined threshold.

If this configuration is used, the medians of the driving frequencies of the driving phases of the multiple-phase battery converter differ from each other by the predetermined frequency (e.g. about 0.2 kHz) in the high load region, so that it is possible to inhibit the occurrence of a "beat" resulting from the nearness of the driving frequencies of the driving phases. Therefore, noise can be more effectively inhibited.

In the fuel cell system according to the present invention, it is possible to provide driving phase control means for constantly driving all driving phases of the multiple-phase battery converter to reduce a current flowing in each driving phase when the load of the load device is equal to or less than the predetermined threshold.

If this configuration is used, all the driving phases of the multiple-phase battery converter are constantly driven so that the current flowing in each driving phase can be reduced in a low load region (a load region in which the load of the load device is equal to or less than the predetermined threshold). Therefore, reactor noise in each driving phase of the multiple-phase battery converter can be reduced.

In the fuel cell system according to the present invention, it is possible to use the frequency setting means for setting driving frequencies of the fuel cell converter and the battery converter so that these driving frequencies are more than an audible range when the load of the load device is equal to or less than the predetermined threshold.

If this configuration is used, the driving frequencies of the fuel cell converter and the battery converter can be more than the audible range in the low load region (a load region in which the load of the load device is equal to or less than the predetermined threshold) in which reactor noise of the fuel cell converter and the battery converter tends to be more than peripheral noise (e.g. air compressor noise or load noise). Therefore, it is possible to effectively inhibit noise resulting from the fuel cell converter and the battery converter in the low load region.

In the fuel cell system according to the present invention, it is possible to use the frequency setting means for setting a driving frequency band of the fuel cell converter and a driving frequency band of the battery converter so that these driving frequency bands do not overlap not only when the load of the load device is more than the predetermined threshold but also when the load is equal to or less than the predetermined threshold.

If this configuration is used, it is possible to prevent the driving frequency band of the fuel cell converter and the driving frequency band of the battery converter from overlapping not only in the high load region but also in the low load region. Therefore, noise can be effectively inhibited in all the load regions.

In the fuel cell system according to the present invention, it is possible to use the frequency setting means for setting driving frequency bands of the fuel cell converter and the battery converter and a driving frequency band of an inverter which controls various devices so that these driving frequency bands do not overlap not only when the load of the load device is more than the predetermined threshold but also when the load is equal to or less than the predetermined threshold.

If this configuration is used, it is possible to prevent the driving frequency bands of the fuel cell converter and the battery converter and the driving frequency band of the inverter which controls various devices (e.g. a traction motor, a hydrogen pump, a cooling water circulating pump, and an air compressor) from overlapping not only in the high load region but also in the low load region. Therefore, noise can be effectively inhibited in all the load regions.

Advantageous of the Invention

According to the present invention, in a fuel cell system which includes a fuel cell converter and a battery converter, it is possible to effectively inhibit noise generated in a high load region in particular and to improve silence.

MODE FOR CARRYING OUT THE INVENTION

Hereinafter, a fuel cell system 1 according to an embodiment of the present invention will be described with reference to the drawings. The fuel cell system 1 according to the present embodiment is an electricity generation system installed in a fuel cell vehicle.

Figure 1:
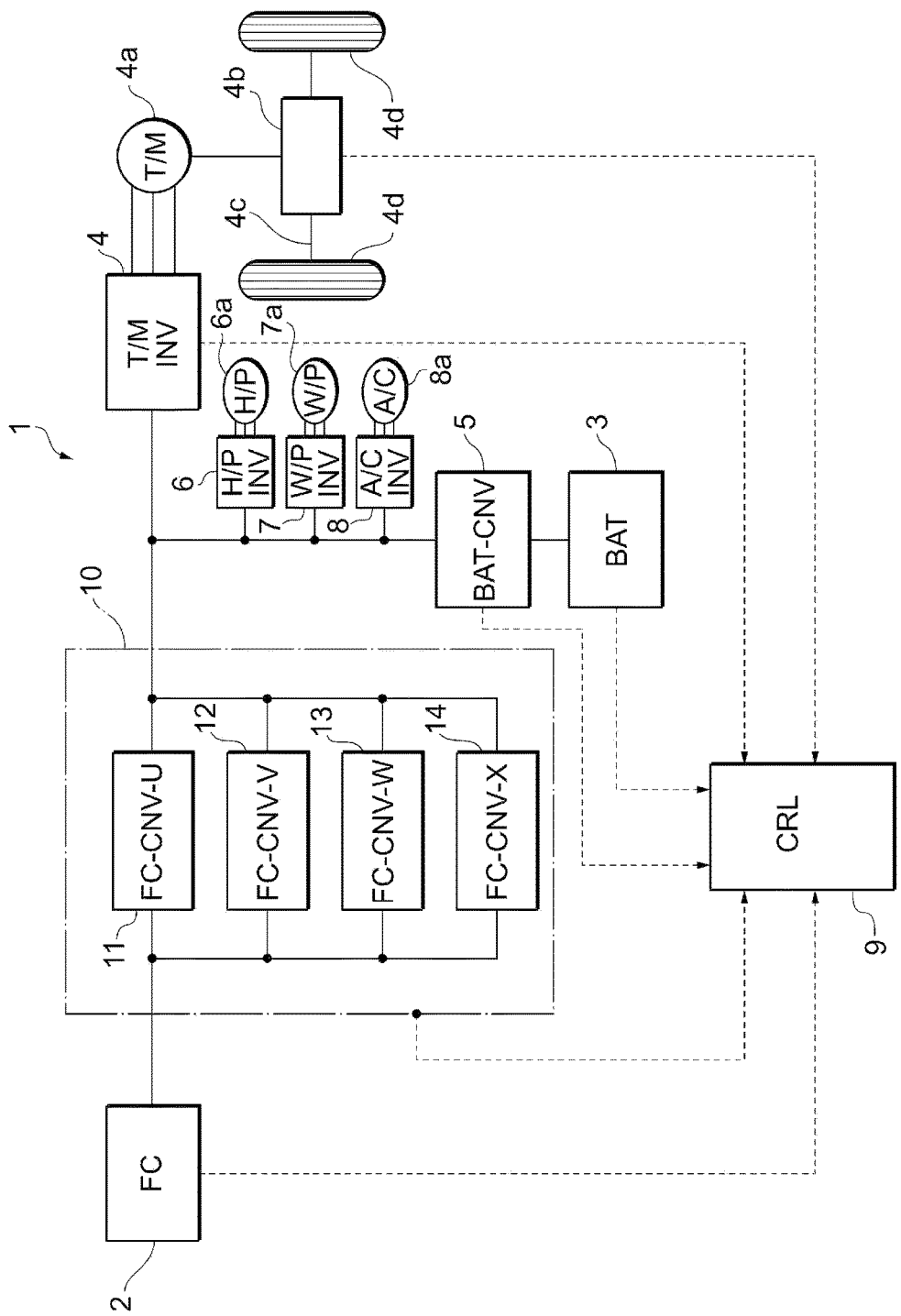
FIG. 1 is a configuration diagram of a fuel cell system according to an embodiment of the present invention.

As shown in FIG. 1, the fuel cell system 1 supplies electricity generated by a fuel cell 2 and a battery 3 to a traction motor 4a through a traction motor inverter 4, and thereby rotationally drives the traction motor 4a. The fuel cell system 1 includes an FC converter 10 provided between the fuel cell 2 and the traction motor inverter 4, a battery converter 5 provided between the battery 3 and the traction motor inverter 4, an inverter (e.g. a hydrogen pump inverter 6, a cooling water circulating pump inverter 7, and an air compressor inverter 8) which controls various auxiliaries, and a controller 9 which performs integrated control of the whole system.

The fuel cell 2 is a solid polymer electrolytic cell stack configured to have a plurality of electric cells stacked in series. In the fuel cell 2, an oxidative reaction in Equation (1) below is caused in an anode electrode, a reduction reaction in Equation (2) below is caused in a cathode electrode, and an electromotive reaction in Equation (3) below is caused in the whole fuel cell 2.

$$H_2 \rightarrow 2H^+ + 2e^- \tag{1}$$

$$(\tfrac{1}{2})O_2 + 2H^+ + 2e^- \rightarrow H_2O \tag{2}$$

$$H_2 + (\tfrac{1}{2})O_2 \rightarrow H_2O \tag{3}$$

The electric cells constituting the fuel cell 2 has a structure in which a membrane-electrode assembly (MEA) configured to have a polymer electrolytic membrane held between the anode electrode and the cathode electrode is held between separators for supplying a fuel gas and an oxidation gas. The fuel cell 2 is provided with a system which supplies the fuel gas to the anode electrode, a system which supplies the oxidation gas to the cathode electrode, and a system which supplies a cooling fluid into the separators. The supply volume of the fuel gas and the supply volume of the oxidation gas are controlled in accordance with a control signal from the controller 9 so that desired electricity can be generated.

The FC converter 10 functions to control an output voltage of the fuel cell 2. As shown in FIG. 1, the FC converter 10 according to the present embodiment is a multiple-phase fuel cell converter in which four phases of a U-phase converter 11, a V-phase converter 12, a W-phase converter 13, and an X-phase converter 14 are connected in parallel. In accordance with a load (required electricity) of a load device such as the traction motor 4a, the FC converter 10 can switch a driving phase to, for example, one-phase driving that only uses one phase (e.g. U-phase), two-phase driving that uses two phases (e.g. U-phase and V-phase), three-phase driving that uses three phases (e.g. U-phase, V-phase, and W-phase), and four-phase driving that uses all the driving phases.

The FC converter 10 controls the output voltage of the fuel cell 2 so that this voltage will be a voltage corresponding to a target output. The output voltage and output current of the FC converter 10 can be detected by a voltage sensor and a current sensor that are not shown. In the present embodiment, a reactor current sensor which detects a current (reactor current) running through a reactor in each driving phase is provided.

The types of switching elements used in the phases (U-phase, V-phase, W-phase, and X-phase) of the FC converter 10 include, for example, diodes such as a junction Schottky diode, a p-i-n/Schottky composite diode, and a MOS barrier Schottky diode; current-controlled transistors such as a bipolar junction transistor (BJT) and a Darlington; thyristors such as a normal thyristor and a gate-turn-off (GTO) thyristor; and voltage-controlled transistors such as a MOS field effect transistor (FET), an insulated gate bipolar transistor (IGBT), and an injection enhanced insulated gate transistor (IEGT). Among these types, the thyristors and the voltage-controlled transistors are preferable.

The battery 3 is connected to the traction motor 4a in parallel to the fuel cell 2. The battery 3 functions to store surplus electricity and regenerative energy during regenerative braking, and also functions as an energy buffer during a load variation caused by acceleration or deceleration of the fuel cell vehicle. As the battery 3, it is possible to use, for example, a secondary cell such as a nickel-cadmium storage cell, a nickel-hydrogen storage cell, or a lithium secondary cell.

The battery converter 5 functions to control an input voltage of each inverter. For example, it is possible to use a battery converter having a circuit configuration similar to that of the FC converter 10. A step-up converter may be used as the battery converter 5, but a step-up/step-down converter capable of step-up operation and step-down operation may be used instead. Various configurations capable of controlling the input voltage of each inverter can be used.

As the traction motor inverter 4, it is possible to use, for example, a PWM inverter driven by a pulse width modulation method. The traction motor inverter 4 converts a direct-current voltage supplied from the fuel cell 2 and the battery 3 to three-phase alternating electricity in accordance with a control instruction from the controller 9, and then controls rotation torque of the traction motor 4a. A PWM inverter can also be used as the inverter (e.g. the hydrogen pump inverter 6, the cooling water circulating pump inverter 7, and the air compressor inverter 8) which controls various auxiliaries (e.g. a hydrogen pump 6a, a cooling water circulating pump 7a, and an air compressor 8a).

The traction motor 4a generates rotation torque serving as power of the fuel cell vehicle, and is also configured to generate regenerative electricity during deceleration. The rotation torque of the traction motor 4a is transmitted to tires 4d through a shaft 4c after decelerated to a predetermined revolving speed by a speed reducer 4b. In the present embodiment, all the devices which operate in response to electricity supplied from the fuel cell 2 are referred to as load devices.

The controller 9 is a computer system which performs integrated control of the fuel cell system 1, and has, for example, a CPU, a RAM, and a ROM. The controller 9 calculates a load (required electricity) of the load device in response to the input of signals (e.g. a signal indicating an accelerator position, a signal indicating a vehicle speed, and signals indicating an output current and an output voltage of the fuel cell 2) supplied from various sensors.

The load of the load device is, for example, a sum value of vehicle running electricity and auxiliary electricity. The auxiliary electricity includes electricity consumed in various auxiliaries (e.g. the hydrogen pump 6a, the cooling water circulating pump 7a, and the air compressor 8a), electricity consumed in devices (a transmission, a wheel controller, a steering device, a suspension device) necessary for vehicle running, and electricity consumed in devices (e.g. an air conditioner, lighting equipment, audio equipment) disposed in a passenger space.

The controller 9 then determines the allocation of output electricity of the fuel cell 2 and the battery 3, and calculates an electricity generation instruction value. Having calculated the required electricity for the fuel cell 2 and the battery 3, the controller 9 controls the operations of the FC converter 10 and the battery converter 5 so that the required electricity can be obtained.

Figure 2:
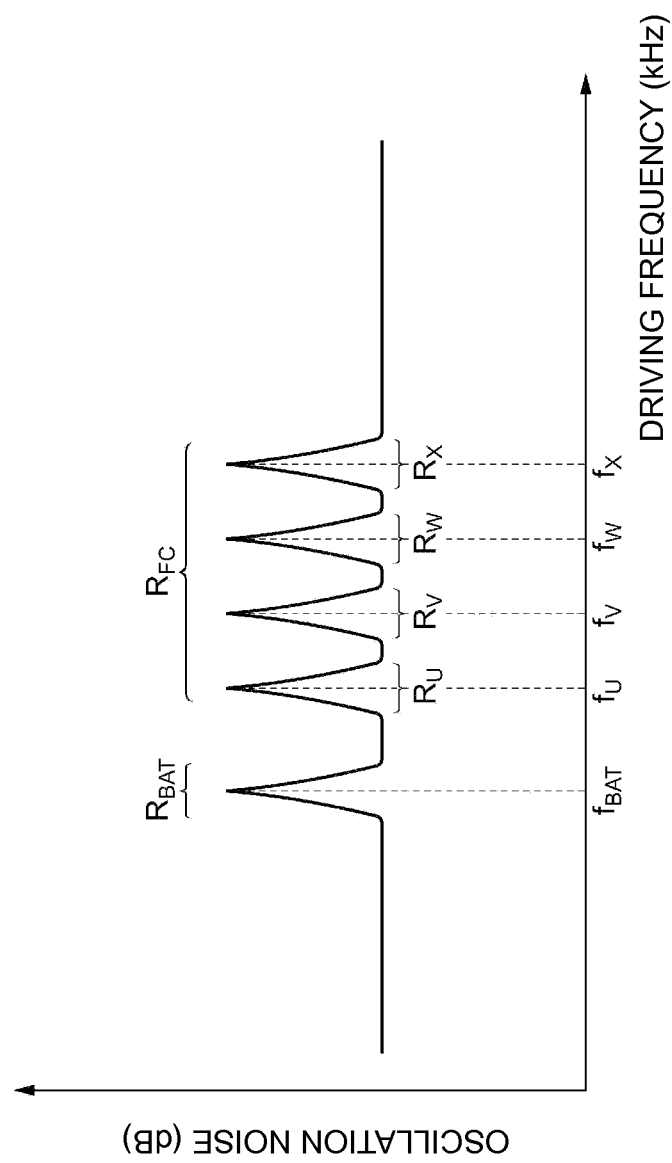
FIG. 2 is a graph showing the relation between a driving frequency of a converter of the fuel cell system shown in FIG. 1 and oscillation noise.

The controller 9 sets a driving frequency band $R_{FC}$ of the FC converter 10 and a driving frequency band $R_{BAT}$ of the battery converter 5 so that these driving frequency bands $R_{FC}$ and $R_{BAT}$ do not overlap as shown in FIG. 2 in a high load region in which the load of the load device is more than a predetermined threshold. That is, the controller 9 functions as frequency setting means in the present invention.

Figure 5:
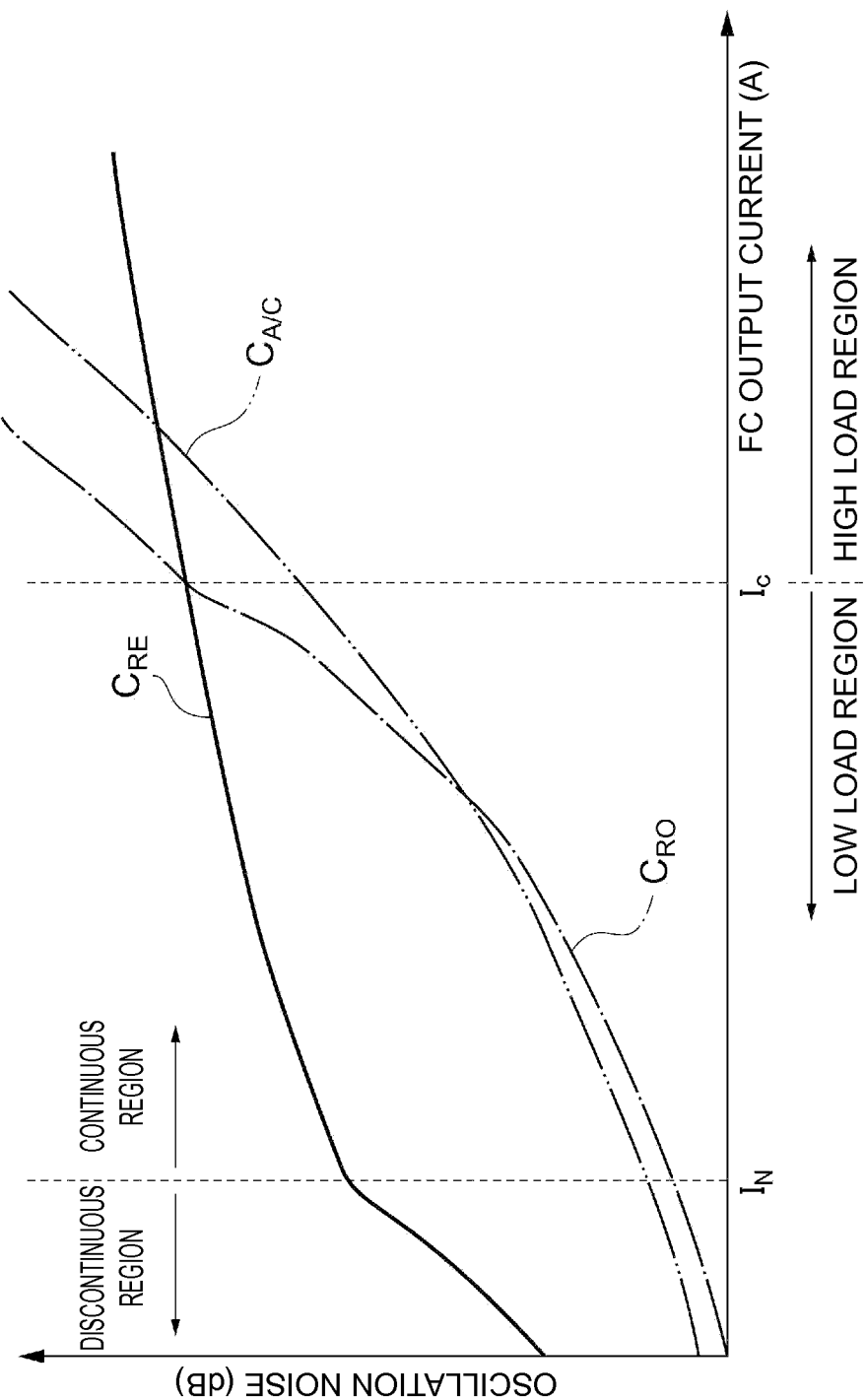
FIG. 5 is a graph showing the relation between an output current of a fuel cell of the fuel cell system shown in FIG. 1 and the oscillation noise.

The threshold of the load can be properly set in accordance with, for example, the scale and specification of the fuel cell system 1, and the environment in which it is used. In order to judge whether the load of the load device is more than the predetermined threshold, an actual load (required electricity) may be calculated, or output electricity or an output current corresponding to the load may be calculated. In the present embodiment, as shown in FIG. 5, when the output current of the fuel cell 2 is more than a predetermined threshold $I_C$, the load of the load device is considered to be more than the predetermined threshold, and the above-mentioned driving frequency control is then performed.

The controller 9 sets driving frequency bands $R_{FC}$ and $R_{BAT}$ of the FC converter 10 and the battery converter 5 and a driving frequency band of the inverter (e.g. the traction motor inverter 4, the hydrogen pump inverter 6, the cooling water circulating pump inverter 7, and the air compressor inverter 8) which controls various devices so that these driving frequency bands do not overlap in the high load region in which the load of the load device is more than the predetermined threshold.

The controller 9 sets driving frequency bands ($R_U$, $R_V$, $R_W$, and $R_X$) of the driving phases (U-phase, V-phase, W-phase, and X-phase) of the FC converter 10 so that the driving frequency bands of the driving phases do not overlap as shown in FIG. 2 in the high load region in which the load of the load device is more than the predetermined threshold. In this case, the controller 9 sets medians ($f_U$, $f_V$, $f_W$, and $f_X$) of the driving frequencies of the driving phases of the FC converter 10 so that these medians differ from each other by a predetermined frequency (e.g. about 0.2 kHz).

The controller 9 specifies a driving phase (U-phase) having the lowest driving frequency among the driving phases (U-phase, V-phase, W-phase, and X-phase) of the FC converter 10 as shown in FIG. 2 in the high load region in which the load of the load device is more than the predetermined threshold. The controller 9 sets the median $f_U$ of the driving frequency of this driving phase and the median $F_{BAT}$ of the driving frequency of the battery converter 5 so that these medians differ from each other by a predetermined frequency (e.g. about 0.2 kHz).

In the high load region in which the load of the load device is more than the predetermined threshold as well, the controller 9 does not perform the above-mentioned driving frequency control when the temperature of a condenser or a switching element included in the FC converter 10 is more than a predetermined threshold.

Figure 3:
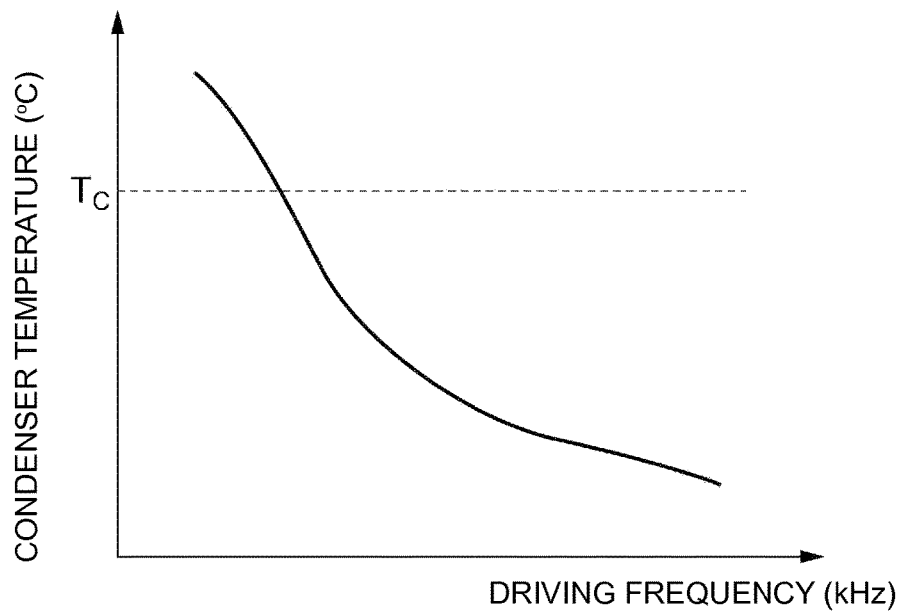
FIG. 3 is a graph showing the relation between a driving frequency of an FC converter of the fuel cell system shown in FIG. 1 and condenser temperature.
Figure 4:
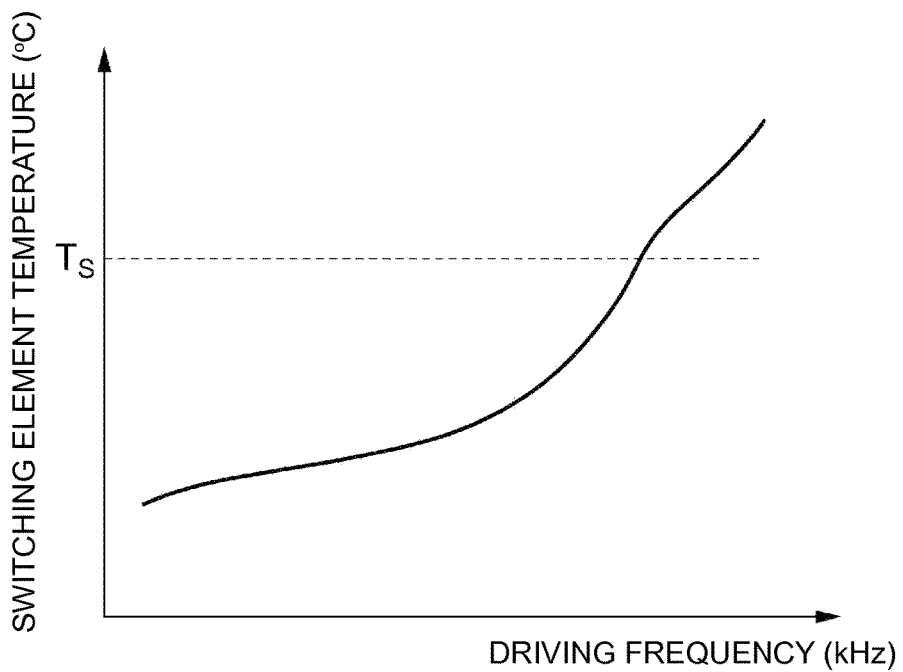
FIG. 4 is a graph showing the relation between the driving frequency of the FC converter of the fuel cell system shown in FIG. 1 and switching element temperature.

The relation between the driving frequency of the FC converter 10 and the condenser temperature is represented by a graph shown in FIG. 3. The relation between the driving frequency of the FC converter 10 and the switching element temperature is represented by a graph shown in FIG. 4. The controller 9 does not change the driving frequency band $R_{FC}$ of the FC converter 10 when the condenser temperature is more than a threshold $T_C$ or when the switching element temperature is more than a threshold $T_S$ in the high load region.

The controller 9 sets the driving frequency of the FC converter 10 so that the driving frequency is more than an audible range in a low load region in which the load of the load device is equal to or less than the predetermined threshold. For example, in the low load region, the controller 9 sets the driving frequency of each driving phase of the FC converter 10 to 15 kHz or more. In the present embodiment, as shown in FIG. 5, when the output current of the fuel cell 2 is more than the predetermined threshold $I_C$, the load of the load device is considered to be equal to or less than the predetermined threshold, and the above-mentioned driving frequency control is then performed.

In the low load region in which the load of the load device is equal to or less than the predetermined threshold (e.g. the output current of the fuel cell 2 is equal to or less than the predetermined threshold $I_C$), reactor noise of the FC converter 10 indicated by a full line $C_{RE}$ in FIG. 5 is higher than load noise indicated by a one-dot chain line $C_{RO}$ in FIG. 5 or air compressor noise indicated by a two-dot chain line $C_{A/C}$. However, noise resulting from the FC converter 10 can be effectively inhibited by the above-mentioned driving frequency control. When the driving frequency of the FC converter 10 is raised, the temperature of a semiconductor element included in the FC converter 10 rises. However, the temperature of the semiconductor element rarely reaches an allowable temperature in the low load region.

In the low load region in which the load of the load device is equal to or less than the predetermined threshold, the controller 9 constantly drives all the driving phases (U-phase, V-phase, W-phase, and X-phase) of the FC converter 10 to reduce a current flowing in each driving phase.

That is, the controller 9 functions as driving phase control means in the present invention.

Figure 6:
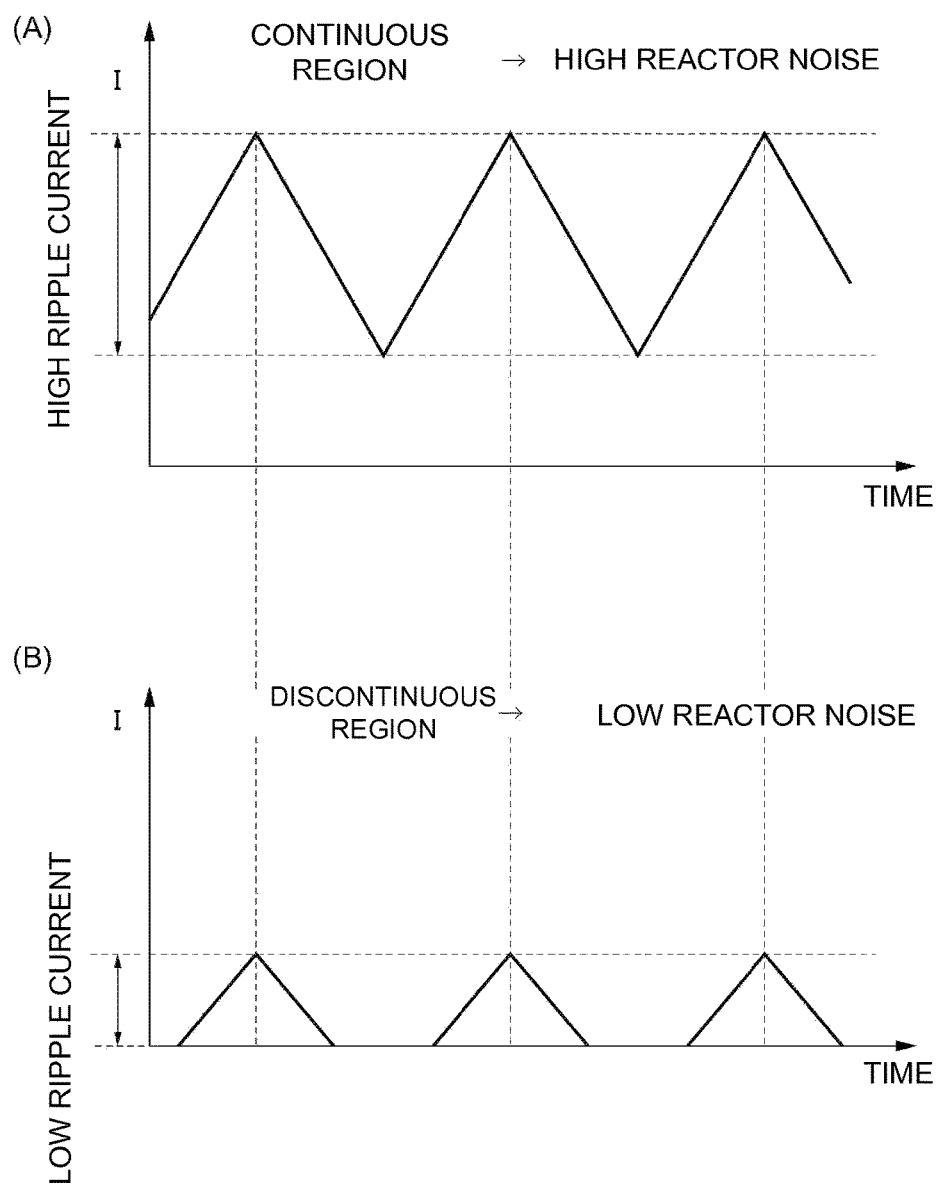
FIG. 6(A) is a time chart in which a reactor current is in a continuous region.
FIG. 6(B) is a time chart in which the reactor current is in a discontinuous region.

It is generally known that the reactor noise is higher as shown in FIG. 6(A) in a continuous region of the reactor current in which a ripple current is high and that the reactor noise is lower as shown in FIG. 6(B) in a discontinuous region of the reactor current in which the ripple current is low. The controller 9 constantly drives all the driving phases of the FC converter 10 and thereby reduces the reactor current in each driving phase to shift the reactor current from the continuous region in FIG. 6(A) to the discontinuous region in FIG. 6(B), so that the reactor noise can be reduced. In the present embodiment, as shown in FIG. 5, when the output current of the fuel cell 2 is equal to or less than the $I_N$, the reactor current shifts from the continuous region to the discontinuous region.

The fuel cell system 1 according to the embodiment described above can prevent the driving frequency band $R_{FC}$ of the FC converter 10 and a driving frequency band $R_{BAT}$ of the battery converter 5 from overlapping in the high load region (a load region in which the load of the load device is more than the predetermined threshold). Therefore, it is possible to effectively inhibit noise generated by the overlapping of the driving frequency bands $R_{FC}$ and $R_{BAT}$ of the FC converter 10 and the battery converter 5 in the high load region.

The fuel cell system 1 according to the embodiment described above can prevent the driving frequency bands $R_U$, $R_V$, $R_W$, and $R_X$ of the driving phases (U-phase, V-phase, W-phase, and X-phase) of the FC converter 10 from overlapping in the high load region. Therefore, it is possible to effectively inhibit noise generated by the overlapping of the driving frequency bands $R_U$, $R_V$, $R_W$, and $R_X$ of the driving phases of the FC converter 10 in the high load region.

In the fuel cell system 1 according to the embodiment described above, the median $f_U$ of the driving frequency of the driving phase (U-phase) lowest in driving frequency among the driving phases of the FC converter 10 differs by the predetermined frequency from the median $f_{BAT}$ of the driving frequency of the battery converter 5 so that the occurrence of a "beat" resulting from the nearness of both the driving frequencies can be inhibited. Moreover, the medians $f_U$, $f_V$, $f_W$, and $f_X$ of the driving frequencies of the driving phases of the FC converter 10 differ from each other by the predetermined frequency so that the occurrence of a "beat" resulting from the nearness of the driving frequencies of the driving phases can be inhibited. Therefore, noise can be more effectively inhibited.

The fuel cell system 1 according to the embodiment described above can prevent the driving frequency bands $R_{FC}$ and $R_{BAT}$ of the FC converter 10 and the battery converter 5 and the driving frequency band of the inverter (the traction motor inverter 4, the hydrogen pump inverter 6, the cooling water circulating pump inverter 7, and the air compressor inverter 8) which controls various devices from overlapping in the high load region. Therefore, it is possible to effectively inhibit noise generated by the overlapping of the driving frequency bands $R_{FC}$ and $R_{BAT}$ of the FC converter 10 and the battery converter 5 and the driving frequency band of the inverter in the high load region.

The fuel cell system 1 according to the embodiment described above can prevent the driving frequency band $R_{FC}$ of the FC converter 10 from being changed in the high load region as well when the temperature of the condenser or the switching element included in the FC converter 10 is more than the predetermined threshold. Therefore, it is possible to avoid a further increase in the temperature of the condenser or the switching element caused by the change of the driving frequency band $R_{FC}$ of the FC converter 10, so that the condenser or the switching element can be protected.

In the fuel cell system 1 according to the embodiment described above, the driving frequency of the FC converter 10 can be more than the audible range in the low load region (a load region in which the load of the load device is equal to or less than the predetermined threshold) in which reactor noise of the FC converter 10 tends to be more than peripheral noise (e.g. air compressor noise or load noise). Therefore, it is possible to effectively inhibit noise resulting from the FC converter 10 in the low load region.

In the fuel cell system 1 according to the embodiment described above, all the driving phases of the FC converter 10 are constantly driven so that the current flowing in each driving phase can be reduced in the low load region. Therefore, reactor noise in each driving phase of the FC converter 10 can be reduced.

Although the present invention is applied to the fuel cell system 1 including the FC converter 10 having a plurality of driving phases in the example shown in the embodiment described above, the present invention is applicable to a fuel cell system including an FC converter having a single driving phase.

It is also possible to use a multiple-phase battery converter having a plurality of driving phases similar to the FC converter 10 used in the embodiment described above. In this case, it is possible to set driving frequency bands of the driving phases of the multiple-phase battery converter so that the driving frequency bands of the driving phases do not overlap in the high load region. At this point, it is possible to set medians of the driving frequencies of the driving phases of the multiple-phase battery converter so that these medians differ from each other by a predetermined frequency (e.g. about 0.2 kHz). Thus, it is possible to effectively inhibit noise generated by the overlapping of the driving frequency bands of the driving phases of the multiple-phase battery converter in the high load region. Moreover, the occurrence of a "beat" resulting from the nearness of the driving frequencies of the driving phases of the multiple-phase battery converter can be inhibited. Therefore, noise can be more effectively inhibited.

In the example shown in the embodiment described above, all the driving phases of the FC converter 10 are constantly driven so that the current flowing in each driving phase is reduced in the low load region. However, it is also possible to constantly drive all the driving phases of the multiple-phase battery converter so that the current flowing in each driving phase is reduced. Thus, reactor noise in each driving phase of the multiple-phase battery converter can be reduced.

In the example shown in the embodiment described above, the driving frequency of the FC converter 10 is more than the audible range in the low load region. However, the driving frequency of the battery converter 5 can also be more than the audible range. Thus, noise resulting from the battery converter 5 can be effectively inhibited.

In the example shown in the embodiment described above, when the output current of the fuel cell 2 is more than the predetermined threshold $I_C$, the load of the load device is considered to be more than the predetermined threshold. However, this is not the only method of judging whether the load of the load device is more than the predetermined threshold. For example, it is also possible to consider that the load of the load device is more than the predetermined threshold when the running speed of the fuel cell vehicle is more than a predetermined threshold.

In the example shown in the embodiment described above, the driving frequency band $R_{FC}$ of the FC converter 10 and the driving frequency band $R_{BAT}$ of the battery converter 5 are prevented from overlapping in the high load region alone. However, it is possible to prevent the driving frequency band $R_{FC}$ of the FC converter 10 and the driving frequency band $R_{BAT}$ of the battery converter 5 from overlapping in the low load region as well. Thus, noise can be effectively inhibited in all the load regions.

In the example shown in the embodiment described above, the driving frequency bands $R_{FC}$ and $R_{BAT}$ of the FC converter 10 and the battery converter 5 and the driving frequency band of the inverter which controls various devices are prevented from overlapping in the high load region alone. However, it is possible to prevent the driving frequency bands $R_{FC}$ and $R_{BAT}$ of the FC converter 10 and the battery converter 5 and the driving frequency band of the inverter which controls various devices from overlapping in the low load region as well. Thus, noise can be effectively inhibited in all the load regions.

Although the fuel cell system according to the present invention is installed in the fuel cell vehicle in the example shown in the embodiment described above, the fuel cell system according to the present invention can also be installed in various movable bodies (e.g. a robot, a ship, and an aircraft) other than the fuel cell vehicle. The fuel cell system according to the present invention may also be applied to a stationary electricity generation system used as electricity generation equipment for an architecture (e.g. a house, or a building). Moreover, the fuel cell system according to the present invention is also applicable to a portable fuel cell system.

1: fuel cell system, 2: fuel cell, 3: battery, 4: traction motor inverter, 4a: traction motor (load device, various devices), 5: battery converter, 6: hydrogen pump inverter, 6a: hydrogen pump (load device, various devices), 7: cooling water circulating pump inverter, 7a: cooling water circulating pump (load device, various devices), 8: air compressor inverter, 8a: air compressor (load device, various devices), 9: controller (frequency setting means, driving phase control means), 10: FC converter (multiple-phase fuel cell converter).

The invention claimed is:

1. A fuel cell system which comprises: a fuel cell; a fuel cell converter provided between the fuel cell and a load device; a battery; a battery converter provided between the battery and the load device; and an air compressor, the fuel cell system further comprising:
   storage means for storing a fuel cell output current threshold, the fuel cell output current threshold being a value of fuel cell output current at which a level of reactor noise volume of the fuel cell converter reaches at least one of: a level of air compressor noise volume and a level of load device noise volume; and
   frequency setting means;
   wherein a high load region is a region where the fuel cell output current is greater than the fuel cell output current threshold that is stored in the storage means,
   wherein a low load region is a region where the fuel cell output current is equal to or less than the fuel cell output current that is stored in the storage means, and
   wherein, the frequency setting means sets a driving frequency band of the fuel cell converter and a driving frequency band of the battery converter so that these driving frequency bands do not overlap only in the high load region.

2. The fuel cell system according to claim 1, wherein the frequency setting means sets a median of the driving frequency of the fuel cell converter and a median of the driving frequency of the battery converter so that these medians differ from each other by a predetermined frequency in the high load region.

3. The fuel cell system according to claim 2, wherein the frequency setting means sets a median of the driving frequency of the fuel cell converter and a median of the driving frequency of the battery converter so that these medians differ from each other by about 0.2 kHz in the high load region.

4. The fuel cell system according claim 1, the fuel cell system further comprising an inverter which provides a driving power for various devices, wherein the frequency setting means sets driving frequency bands of the fuel cell converter and the battery converter and a driving frequency band of the inverter so that these driving frequency bands do not overlap in the high load region.

5. The fuel cell system according to claim 1, wherein the frequency setting means does not change the driving frequency band of the fuel cell converter when the temperature of a condenser or a switching element included in the fuel cell converter is more than a predetermined threshold.

6. The fuel cell system according claim 1, wherein the fuel cell converter is a multiple-phase fuel cell converter having a plurality of driving phases, and
   the frequency setting means sets driving frequency bands of the driving phases of the multiple-phase fuel cell converter so that the driving frequency bands of the driving phases do not overlap in the high load region.

7. The fuel cell system according to claim 6, wherein the frequency setting means sets medians of the driving frequencies of the driving phases of the multiple-phase fuel cell converter so that these medians differ from each other by a predetermined frequency in the high load region.

8. The fuel cell system according to claim 7, wherein the frequency setting means sets medians of the driving frequencies of the driving phases of the multiple-phase fuel cell converter so that these medians differ from each other by about 0.2 kHz in the high load region.

9. The fuel cell system according to claim 6, further comprising driving phase control means for constantly driving all driving phases of the multiple-phase fuel cell converter to reduce a current flowing in each driving phase in the high load region.

10. The fuel cell system according to claim 1, wherein the battery converter is a multiple-phase battery converter having a plurality of driving phases, and the frequency setting means sets driving frequency bands of the driving phases of the multiple-phase battery converter so that the driving frequency bands of the driving phases do not overlap in the high load region.

11. The fuel cell system according to claim 10, wherein the frequency setting means sets medians of the driving frequencies of the driving phases of the multiple-phase battery converter so that these medians differ from each other by a predetermined frequency in the high load region.

12. The fuel cell system according to claim 11, wherein the frequency setting means sets medians of the driving frequencies of the driving phases of the multiple-phase battery converter so that these medians differ from each other by about 0.2 kHz in the high load region.

13. The fuel cell system according to claim 10, further comprising driving phase control means for constantly driving all driving phases of the multiple-phase battery converter to reduce a current flowing in each driving phase in the high load region.

14. The fuel cell system according to claim 1, wherein the frequency setting means sets a driving frequency of the fuel cell converter so that the driving frequency is more than an audible range in the high load region.

15. The fuel cell system according to claim 1, wherein the frequency setting means sets a driving frequency of the battery converter so that the driving frequency is more than the audible range in the high load region.

* * * * *